(12) United States Patent
Munger et al.

(10) Patent No.: US 12,548,641 B2
(45) Date of Patent: Feb. 10, 2026

(54) METHODS AND TECHNIQUES FOR PROCESSING RESPONSES OF AN OLFACTORY TEST

(71) Applicants: University of Florida Research Foundation, Incorporated, Gainesville, FL (US); Arizona Board of Regents on behalf of Arizona State University, Phoenix, AZ (US); The Penn State Research Foundation, University Park, PA (US)

(72) Inventors: Steven Dunn Munger, Gainesville, FL (US); John E. Hayes, University Park, PA (US); Richard Gerkin, Phoenix, AZ (US)

(73) Assignees: University of Florida Research Foundation, Incorporated, Gainesville, FL (US); Arizona Board of Regents on behalf of Arizona State University, Phoenix, AZ (US); The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/573,920

(22) PCT Filed: Jun. 29, 2022

(86) PCT No.: PCT/US2022/035428
§ 371 (c)(1),
(2) Date: Dec. 22, 2023

(87) PCT Pub. No.: WO2023/278510
PCT Pub. Date: Jan. 5, 2023

(65) Prior Publication Data
US 2024/0321413 A1    Sep. 26, 2024

Related U.S. Application Data

(60) Provisional application No. 63/308,741, filed on Feb. 10, 2022, provisional application No. 63/218,196, filed on Jul. 2, 2021.

(51) Int. Cl.
*G16H 10/20* (2018.01)

(52) U.S. Cl.
CPC .................................. *G16H 10/20* (2018.01)

(58) Field of Classification Search
CPC ........................... A61B 5/4011; A61B 5/4088
See application file for complete search history.

(56) References Cited

U.S. PATENT DOCUMENTS

2017/0227548 A1    8/2017  Henkin
2017/0290541 A1*  10/2017  Albers ................. A61B 5/4082
(Continued)

FOREIGN PATENT DOCUMENTS

WO    WO 2023278510 A    1/2023

OTHER PUBLICATIONS

Niedenthal S, Nilsson J, Jernsäther T, Cuartielles D, Larsson M, Olofsson JK. A Method for Computerized Olfactory Assessment and Training Outside of Laboratory or Clinical Settings. Iperception. Jun. 11, 2021;12(3):20416695211023953. doi: 10.1177/20416695211023953. PMID: 34178300; PMCID: PMC8202270 (Year: 2021).*

(Continued)

*Primary Examiner* — Joseph D Burgess
(74) *Attorney, Agent, or Firm* — Alston & Bird LLP

(57) ABSTRACT

An olfactory test comprising an olfactory test article including a plurality of trials that each has an associated concentration of a stimulus of interest. Aspects of the present disclosure further relate to software application that guides a user through conducting the olfactory test based at least in (Continued)

part on the user's responses to trials of the olfactory test article, such that the user can be guided through a custom order of trials, and therefore different concentrations of the stimuli of interest, based at least in part on the user's responses to the trials as the user performs the olfactory test.

20 Claims, 10 Drawing Sheets

(56) References Cited

U.S. PATENT DOCUMENTS

| | | | |
|---|---|---|---|
| 2019/0021645 A1 | 1/2019 | Mochizuki | |
| 2019/0367963 A1 | 12/2019 | Yoshikawa | |
| 2020/0253531 A1* | 8/2020 | Smith | A61B 5/4011 |
| 2022/0054074 A1* | 2/2022 | Stodgell | A61B 5/01 |
| 2022/0392065 A1* | 12/2022 | Min | A61B 8/5223 |

OTHER PUBLICATIONS

A. Fukasawa, R. Suzuki and K.-I. Okada, "Olfactory Measurement System to Quantify the Ability to Smell Using Pulse Ejection," 2013 IEEE International Conference on Healthcare Informatics, Philadelphia, PA, USA, 2013, pp. 99-106, doi: 10.1109/ICHI.2013.19 (Year: 2013).*

International Search Report and Written Opinion for Patent Cooperation Treaty Application No. PCT/US2022/035428 dated Nov. 7, 2022, 15 pages.

Doty RL, et al., "University of Pennsylvania Smell Identification Test: A Rapid Quantitative Olfactory Function Test for the Clinic," *The Laryngoscope*, vol. 94, (3 pages), Feb. 1984.

Kobal G, et al., "'Sniffin'sticks": Screening of Olfactory Performance', *Rhinology*, vol. 34, pp. 222-226, Dec. 1, 1996.

Oleszkiewicz A et al., "Updated Sniffin'Sticks Normative Data Based on an Extended Sample of 9139 Subjects," *European Archives of Oto-Rhino-Laryngology*, vol. 276, pp. 719-728, Apr. 15, 2019, https://doi.org/10.1007/s00405-018-5248-1.

Hochenberger R, et al., "Estimation of Olfactory Sensitivity Using a Bayesian Adaptive Method", *Nutrients*, vol. 11, (15 pages), Jun. 15, 2019, https://doi.org/10.3390/nu11061278.

Lesmes, L.A. et al., "Developing Bayesian Adaptive Methods for Estimating Sensitivity Thresholds (d') in Yes-No and Forced-Choice Tasks", *Frontiers in Psychology*, vol. 6, (24 pages), Aug. 4, 2015, doi:10.3389/fpsyg.2015.01070.

Dalton, P., et al., "Olfactory Assessment Using the NIH Toolbox", *Neurology*, vol. 80, (5 pages), Mar. 12, 2013, https://doi.org/10.1212/WNL.0b013e3182872eb4.

Cometto-Muñiz, JE, et al., "Human Olfactory Detection of Homologous n-alcohols Measured via Concentration-Response Functions", *Pharmacology Biochemistry Behavior*, vol. 89, pp. 279-291, Jan. 7, 2008, https://doi.org/10.1016/j.pbb.2007.12.023.

Weir, E.M. et al., "The Adaptive Olfactory Measure of Threshold (ArOMa-T): A Rapid Test of Olfactory Function", *Chemical Senses*, vol. 47, (11 pages), Dec. 5, 2022, https://doi.org/10.1093/chemse/bjac036.

Parma, Valentina et al., "SCENTinel 1.0: Development of a Rapid Test to Screen for Smell Loss", *Chemical Senses*, vol. 46, (11 pages), Mar. 27, 2021, doi:10.1093/chemse/bjab012.

Hunter S.R. et al., "Proof-of-Concept: SCENTinel 1.1 Rapidly Discriminates COVID-19-Related Olfactory Disorders", *Chemical Senses*, vol. 48, (12 pages), Feb. 17, 2023, https://doi.org/10.1093/chemse/bjad002.

Hedner, M. et al., "Cognitive Factors in Odor Detection, Odor Discrimination, and Odor Identification Tasks", *Journal of Clinical and Experimental Neuropsychology*, vol. 32, pp. 1062-1067, Feb. 4, 2010, https://doi.org/10.1080/13803391003683070.

* cited by examiner

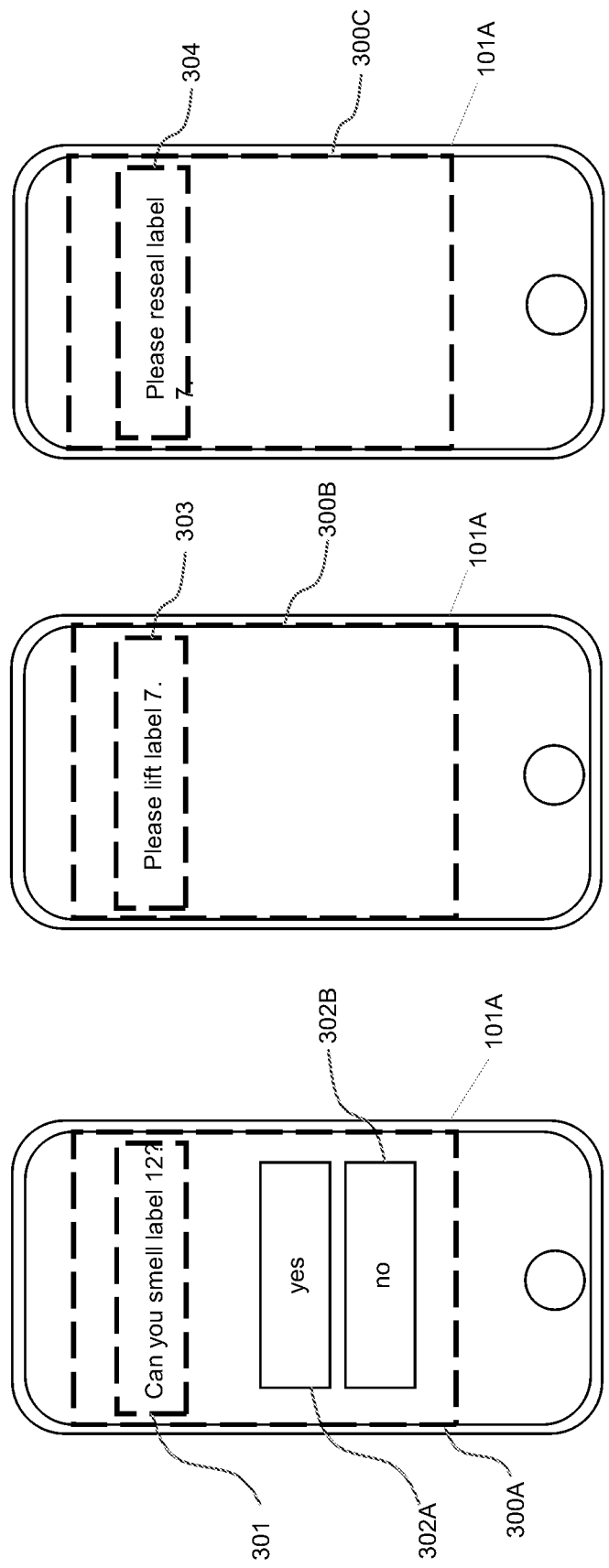

METHODS AND TECHNIQUES FOR PROCESSING RESPONSES OF AN OLFACTORY TEST

CROSS REFERENCE TO RELATED APPLICATIONS

This application is a National Stage Application, filed under 35 U.S.C. § 371, of International Application No. PCT/US2022/035428, filed Jun. 29, 2023, which claims priority to U.S. Application No. 63/218,196, filed Jul. 2, 2021, and U.S. Application No. 63/308,741, filed Feb. 10, 2022; the contents of all of which are hereby incorporated by reference in their entirety.

STATEMENT OF GOVERNMENT SUPPORT

This invention was made with government support under Grant No. DC019573 and Grant No. DC018455, awarded by the National Institutes of Health, and Grant No. PEN04708, awarded by United States Department of Agriculture/National Institute of Food and Agriculture. The government has certain rights in the invention.

BACKGROUND

Related Field

FIELD OF THE DISCLOSURE

The present application relates to computerized techniques for administering olfactory tests, including in some embodiments processing a user's responses to trials within an olfactory test in order to determine the next recommended trial of the olfactory test for the user to perform.

Description of Related Art

Olfactory dysfunctions are prevalent and underdiagnosed medical conditions that can have serious consequences for health, diet, safety and quality of life. Some consequences include a decreased ability to detect dangers such as fire or spoiled food, altered diet, and feelings of disconnection from the environment and other people. Some estimates suggest up to 1 in 4 people may have some type of olfactory disorder. The most common causes for olfactory disorders are head trauma, sinonasal disease, and upper respiratory infections. Olfactory dysfunction can also be an early biomarker of neurodegenerative diseases, including Alzheimer's disease and Parkinson's disease, where olfactory deficits precede detectable memory loss. Despite the impact of olfactory disorders on patients and their known associations with other serious health conditions, olfactory function is infrequently tested in routine clinical practice.

While the importance of olfactory disorders has historically been neglected despite their prevalence and impact, public awareness of anosmia increased dramatically when sudden smell loss was highlighted as a highly predictive symptom of COVID-19. Meta-analyses and other studies suggest 30-75% of COVID-19-positive individuals (these numbers may vary depending on which SARS-CoV-2 variant is prevalent) experienced at least a transient loss of smell, while long term smell loss may persist in millions of individuals, with substantially negative impact on quality of life.

Psychophysical testing employed in clinical settings is typically used to determine if a patient has a quantitative olfactory disorder: either anosmia (a complete or near complete loss of smell) or hyposmia (where the patient's ability to detect or perceive odors is substantially reduced but not absent). Notably, quantitative tests are not optimized to assess qualitative disorders like parosmia (distorted smell) or phantosmia (distorted smell), which depend on patient report. Quantitative tests typically measure one or more specific parameters: odor identification ("what is this? vanilla!"), odor discrimination ("is this smell different from the last one?"), and odor detection threshold (odorDT) ("what is the lowest concentration the patient can smell?"). The two most common clinical tests are the University of Pennsylvania Smell Identification Test (UPSIT), which is composed of 40 odor identification questions and Sniffin' Sticks, which measures odor identification, odor discrimination, and odor detection threshold to create a composite score or index of function. In clinical samples, multiple measures of olfactory performance are typically highly correlated. Therefore, using just one measure often suffices in normal practice.

Widely used psychophysical tests for diagnosis of hyposmia and anosmia have some limitations. For example, odor identification tasks require the patient to a) smell the stimulus, b) recognize the stimulus from prior experience, and c) communicate the correct name. Thus, this measure confounds sensory performance with memory recall and verbal ability. Odor identification may also be challenging if stimuli are culturally or experientially dependent (e.g., root beer is widely known in the United States, but not Europe or Asia). Thus, odor identification tests should be validated in different populations and global locations prior to mainstream clinical use to obtain appropriate normative data. Further, odor identification tests make cognitive demands that may pose issues for elderly patients or other special populations (e.g., children, or those with cognitive impairments). Odor discrimination tests also have cognitive demands, particularly regarding working memory, that can limit their use in such populations.

By contrast, olfactory tests based on odor detection have several potential advantages. Such tests are semantic-free, thus avoiding issues of familiarity, naming, and recall. They also may be more sensitive and/or specific measures of hyposmia and anosmia. That is, the odorants given in an odor identification task are normally presented at a concentration well above threshold, so a small but real drop in olfactory function may be missed. In this case, the drop may not impair the ability of the patient to successfully identify and name the odor, despite the presence of a true quantitative loss. A subject's sense of smell can be operationalized in terms of threshold (e.g., what is the lowest concentration the subject can smell), discrimination (e.g., can the subject tell one odor from another) and identification (e.g., can you name/describe the odor correctly). For example, a threshold test can measure whether a subject can perceive a specific concentration of an odorant and/or can measure the lowest concentration(s) a subject can perceive. Another example is a discrimination test that tests whether the subject can distinguish between different smells. A further example of an olfactory test includes identification, which indicates if a subject can name or describe an odor correctly (e.g., based at least in part on a list of names).

Still, odor detection tests are used much less frequently in clinical settings, in part due to difficulties with stimulus control and test duration. Indeed, threshold estimation using traditional methods (such as a 2-down/1-up staircase) can take 30 minutes or more to get a single measure of threshold.

BRIEF SUMMARY

Some aspects relate to a computerized method for processing responses of an olfactory test performed by a user. In one embodiment, the method comprises receiving, by a computing device, data representative of a plurality of responses, each response indicating whether or not the user detects one or more stimuli for a trial of a plurality of trials of an olfactory test article. The method further comprises accessing, by the computing device, stored information comprising a plurality of possible series of trials and responses, wherein each possible series of trials and responses is associated with a recommended next trial of the plurality of trials. The method further comprises determining, for each of the plurality of responses, a next trial for the user to perform by matching the data to a series of trials and responses of the plurality of series of trials and responses, generating, for each of the plurality of responses, based at least in part on the matched series of trials and responses, an instruction for the user to perform the next trial, generating an threshold based at least in part on the plurality of responses and a plurality of trials corresponding to the plurality of responses, and rendering, by the computing device, a representation of the odor detection threshold.

In some embodiments, a measure corresponding to an odor detection threshold of a user may be generated based at least in part on the plurality of responses. In some embodiments, the one or more stimuli may comprise one or more concentrations of one or more odorants. In some embodiments, the one or more odorants may comprise phenyl ethyl alcohol. In some embodiments, the one or more odorants may comprise at least one of: butanol, beta-ionone, rotundone, androstenone, or a trigeminal stimulant. In some embodiments, a recommended next trial for each of the plurality of possible series of trials and responses may be determined by calculating an expected value and standard error of an estimate for a parameter of interest for each potential response to each of one or more unperformed trials of the plurality of trials, and the recommended next trial for each of the plurality of possible series of trials and responses is stored. In some embodiments, determining the recommended next trial for each of the plurality of possible series of trials and responses may further comprise determining a trial of the one or more unperformed trials that minimized the standard error of the estimate for the parameter of interest. In some embodiments, the user may be classified as normosmic, hyposmic, or anosmic based at least in part on the plurality of responses.

Some aspects relate to a device configured to process responses of an olfactory test performed by a user. The device includes at least one computer processor, and at least one storage device encoded with a plurality of computer-executable instructions. When executed by at least one computer processor, the instructions cause the device to at least: receive data representative of a plurality of responses, where each response indicates whether or not the user detects one or more stimuli for a trial of a plurality of trials of an olfactory test article, access stored information comprising a plurality of possible series of trials and responses, wherein each possible series of trials responses is associated with a recommended next trial of the plurality of trials, determine, for each of the plurality of responses, a next trial for the user to perform by matching the data to a series of trials and responses of the plurality of series of trials and responses, generate, for each of the plurality of responses, based at least in part on the matched series of trials and responses, an instruction for the user to perform the next trial, generate an odor detection threshold based at least in part on the plurality of responses and a plurality of trials corresponding to the plurality of responses, and render a representation of the odor detection threshold.

In some embodiments, the device may be configured to generate a measure corresponding to an odor detection threshold of a user based at least in part on the plurality of responses. In some embodiments, the one or more stimuli may comprise one or more concentrations of one or more odorants. In some embodiments, the one or more odorants may comprise phenyl ethyl alcohol. In some embodiments, the one or more odorants may comprise at least one of: butanol, beta-ionone, rotundone, androstenone, or a trigeminal stimulant. In some embodiments, the device may be further configured to determine a recommended next trial for each of the plurality of possible series of trials and responses by calculating an expected value and standard error of an estimate for a parameter of interest for each potential response to each of one or more unperformed trials of the plurality of trials and store the recommended next trial for each of the plurality of possible series of trials and responses. In some embodiments, determining the recommended next trial for each of the plurality of possible series of trials and responses may further comprise determining a trial of the one or more unperformed trials that minimized the standard error of the estimate for the parameter of interest. In some embodiments, the device may be configured to classify the user as normosmic, hyposmic, or anosmic based at least in part on the plurality of responses.

Some aspects relate to a computer program product for processing responses of an olfactory test performed by a user. The computer program product includes at least one non-transitory computer-readable storage medium having computer-readable program code portions stored therein. The computer-readable program code portions are configured to: receive data representative of a plurality of responses, where each response indicates whether or not the user detects one or more stimuli for a trial of a plurality of trials of an olfactory test article, access stored information comprising a plurality of possible series of trials and responses, wherein each possible series of trials responses is associated with a recommended next trial of the plurality of trials, determine, for each of the plurality of responses, a next trial for the user to perform by matching the data to a series of trials and responses of the plurality of series of trials and responses, generate, for each of the plurality of responses, based at least in part on the matched series of trials and responses, an instruction for the user to perform the next trial, generate an odor detection threshold based at least in part on the plurality of responses and a plurality of trials corresponding to the plurality of responses, and render a representation of the odor detection threshold.

In some embodiments, the computer-readable program code portions may be further configured to generate a measure corresponding to an odor detection threshold of a user based at least in part on the plurality of responses. In some embodiments, the computer-readable program code portions may be further configured to determine a recommended next trial for each of the plurality of possible series of trials and responses by calculating an expected value and standard error of an estimate for a parameter of interest for each potential response to each of one or more unperformed trials of the plurality of trials, and store the recommended next trial for each of the plurality of possible series of trials and responses. In some embodiments, determining the recommended next trial for each of the plurality of possible series of trials and responses may further comprise determining a trial of the one or more unperformed trials that minimized the standard error of the estimate for the parameter of interest.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A illustrates an exemplary image of a display on a device configured to receive a response from a user, according to some embodiments.

FIG. 3B illustrates an exemplary image of a display on a device configured to display an instruction to a user, according to some embodiments.

FIG. 3C illustrates an exemplary image of a display on a device configured to display another instruction to a user, according to some embodiments.

DETAILED DESCRIPTION OF VARIOUS EMBODIMENTS

Figure 1:
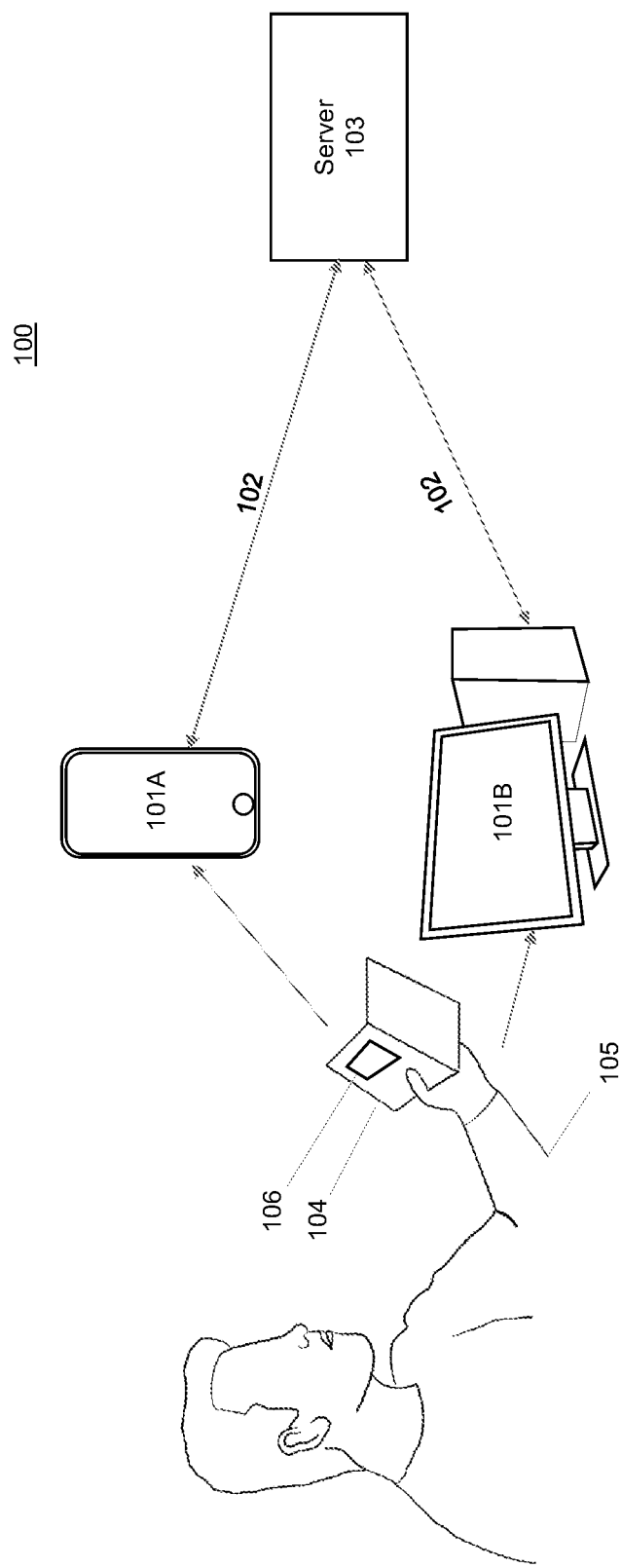
FIG. 1 illustrates a block diagram of an exemplary system for administering and processing responses of an olfactory test, according to some embodiments.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Exemplary Technical Improvements

The present disclosure describes aspects of methods, articles, and systems for administering an olfactory test, including processing a user's responses of an olfactory test to guide a subject's use of the olfactory test. In some embodiments, the olfactory test comprises an odor detection threshold test including a physical card-based tool that is paired with an adaptive Bayesian algorithm programming software executed on a computing device. The adaptive Bayesian algorithm programming software may be configured to guide a user through one or more tasks associated with the odor detection threshold test. The one or tasks may include self-administration of stimulus concentrations that will be maximally informative in determining an estimate of an odor detection threshold for the user.

Methods of administering and processing responses of conventional olfactory tests are often limited since they require users to statically perform the same limited trial(s) without considering a user's response to the trials. For example, an olfactory test of a first and second user typically requires both users to perform the same set of trials regardless of the individual responses of the first and second users. As a result, the tests are often limited to just one or a few trials that are all performed by each user. Such approaches are often time consuming for both patients and providers and can be clinically challenging as not all tests may yield the same amount of information for different users that have different abilities to smell. For example, a user who cannot detect stimuli of a first concentration will not be able to detect stimuli of a fraction of the first concentration, so performing the trial with the lesser concentration typically produces a response that does not provide additional information regarding the ability of the user to detect the stimuli. Relatedly, such tests cannot be customized to the individual performance of each user. As a result, conventional olfactory tests are suboptimal at providing tailored and efficient testing commensurate with the individual capabilities of each user.

Accordingly, the techniques described further herein provide for easily administering an olfactory test that includes a series of trials (e.g., seven trials, eight trials, nine trials, ten trials, eleven trials, twelve trials, thirteen trials, sixteen trials, twenty trials, etc.). The techniques provide a software application that guides a user through the series of trials that is configured to process, in real-time as the subject takes the olfactory test, the subject's responses to the trials by using an adaptive method. For example, the user can initially be instructed to start at a first one of a plurality of trials. Based at least in part on the user's response to the first trial, the application provides an instruction for a next recommended trial, and so on (e.g., an ordered set of trial steps). Accordingly, the application can guide the user through a series of trials based at least in part on the user's responses to previously conducted trials. By doing so, the total number of trials a user performs for the olfactory test may be significantly decreased compared to the full set of trials of the olfactory test, and the set of trials can be customized to those that provide clinically relevant information for the user.

In some embodiments, a software application executing an adaptive Bayesian algorithm can determine a next trial through a series of calculations after each user response. For example, based at least in part on a user's response to a trial, the software application may determine a next trial based at least in part on the user's past response(s) by calculating probabilities of each possible response for each potential unperformed trials of the plurality of trials. In some embodiments, the software application can perform calculations (e.g., of all possible response paths) in advance of administering an olfactory test. For example, calculations can be performed and stored on a memory device by the software application to establish (e.g., in a database, look-up table, etc.) all possible series of trials and responses of a user along with pre-calculated recommended trials. In some embodiments, the stored calculations may comprise a Bayesian model. As a result, for each new user trial response, the software application can efficiently determine the next recommended trial by performing a determination or lookup based at least in part on the current series of user trial responses to determine the next recommended trial for the user.

The techniques described herein can be used to provide inexpensive olfactory tests that can be easily taken (or administered) by users with little or no medical training in non-clinical (e.g., at home, in schools, at workplaces, etc.), as well as clinical settings. In particular, the accompanying software application can provide a user with step-by-step, easy to understand instructions that guide the user through performing an olfactory test. As described further herein, not only may the software application guide the user through performing the olfactory test, but the software application may also customize various trials to match specific responses of each user. As a result, not only is the disclosed olfactory test easy to use, but the olfactory test may also be automatically customized for each individual user's responses. For example, one user may be guided to perform a series of trials that guide the user to smell a stimulus/odorant using a first series of labels for the olfactory test, while another user may be guided to perform a different (e.g., in some instances, quite different) trials that guide the user to smell a stimulus/odorant using a second series of labels based at least in part on each user's individual responses as they perform the trials.

An article component of the olfactory test may comprise a test packet, test card, or booklet, such as a foldable test card that can be mailed or delivered to a user. As a result, the olfactory test can be easily distributed, easily manufactured/produced, and simply discarded after use. The olfactory test article can include a set of separately identifiable peel-and-burst trials (e.g., identifiable by different numbers, letters, textual descriptions, etc.), where each trial has an associated concentration of a stimulus of interest (e.g., phenylethyl alcohol, which has a floral scent to it). In some embodiments, each trial can be associated with a different concentration of the stimuli. For example, an olfactory test article may include trials with no stimuli, a trial having a highest stimulus concentration, a trial having a lowest stimulus concentration, and a plurality of intermediate stimuli concentrations. Intervals between concentrations of the trials may be in half-log steps (e.g., 0.5 $\log_{10}$ units of concentration, or half an order of magnitude), or other step sizes, and magnitudes of a stimulus concentration range that roughly spans the range of normal human detection thresholds for the stimuli. Compared to large and expensive lab equipment or other testing equipment, such a test card embodiment can be significantly cheaper and easier to use than other olfactory testing approaches.

Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages.

An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 presents a block diagram of an exemplary system 100 for administering and processing responses of an olfactory test, according to some embodiments. As described herein, a user 105 may perform an olfactory test by performing one or more trials of an olfactory test article 104 (e.g., a test booklet that can be mailed to the user). The user 105 can be instructed to use a computing device, such as mobile device 101A and/or computer 101B, to access a software application that guides the user 105 through the olfactory test article 104. The olfactory test article 104 may comprise a plurality of trials that may be taken in a specific order according to instructions generated by the software application.

Generally, as explained in further detail herein, the software application can instruct a user 105 to perform a series of trials on the olfactory test article 104 by receiving and processing data representative of the user's trial responses to instruct the user 105 on which next trial(s) to perform. It should be appreciated that in some embodiments, the olfactory test is performed by a single user 105 that is the subject of the olfactory test. In such cases, the subject of the olfactory test also uses the software application and manipulates the trials of the olfactory test article 104 accordingly (e.g., by peeling the label to smell the trial, scratching and smelling the trial, etc.). It should be appreciated that in some embodiments, a second person assists the subject with conducting the olfactory test, such as by a doctor, nurse, or other clinician, and/or by another person (e.g., a family member, friend, etc.). As a result, the second person can help the subject use the software application and/or perform steps necessary to conduct the trials of the olfactory test.

As also shown in FIG. 1, the user device (e.g., mobile device 101A, computer 101B, and/or the like) may communicate with a server 103 via one or more networks 102 to provide test results to a central database and/or data store for logging, evaluation, etc. According to some embodiments, the user device may send information regarding olfactory tests (e.g., user information, test information including olfactory trial responses and results) to the server 103. The test information can be used to perform clinical analysis of the user responses.

In some embodiments, the software application uses stored information that includes a plurality of possible series of user responses to test trials. In some embodiments, the stored information may comprise a Bayesian model. Each series of responses in the stored information may be associated with a recommended subsequent (next) trial of the plurality of trials for the particular series of responses, e.g., such that the recommended trial is maximally informative about the user's own sense of smell given the outcomes of both previous and the recommended next trial. In some embodiments, such stored trial recommendation information is stored at the server 103 and provided to the user device through a web interface (e.g., via REDCap). The user device can send trial responses to the server 103 (e.g., one at a time, in bulk, etc.), and the server 103 can match the trial responses of the user 105 to the series of responses in the stored information to determine a next trial for the user 105 to perform. Additionally, the server may generate an instruction based at least in part on the determined next trial and may transmit information regarding a next trial via network 102 to the user device. The user device may subsequently display the instruction to the user 105 to instruct the user which test to perform next.

In some embodiments, the trial recommendation information is stored at the user device. According to some embodiments, the server 103 may transmit the stored information to a user device via a network (e.g., shown as 102 in FIG. 1). As explained above, the stored information may include a plurality of possible series of trials and responses, with each series of responses in the stored information associated with a recommended next trial. In such embodiments, the user device may receive information regarding the one or more responses from a user 105 (e.g., through user input, etc.). The user device may match the one or more responses of the user 105 to the series of responses in the received stored information to determine a next trial for the user. Additionally, the user device may generate an instruction based at least in part on the determined next trial and may subsequently display the instruction to the user 105. In some embodiments, the user device can implement olfactory test guiding functionality on its own without requiring communication with server 103 (or remote computing devices, databases, and cloud infrastructures), such that the user device stores a computer program configured to implement the aspects of the software application described herein when executed by a processor of the user device).

In some embodiments, the software application computes a next recommended trial for one or more test steps while the user conducts a trial (e.g., rather than using stored test information). For example, in some embodiments the software application may communicate trial responses to the server 103, and the server 103 may determine a recommended next trial for the user. The recommended next trial may be subsequently sent to the user device via the one or more networks 102 and the user device may generate an instruction based at least in part on the recommended next trial for the user. Alternatively, the server 103 may generate an instruction based at least in part on the recommended next trial for the user and then send the instruction to the user device. As another example, the software application (e.g., without leveraging the server 103) can compute the next recommended trial.

In some embodiments, instead of guiding a user through steps based at least in part on trial responses using a software program implemented by a user device, trial recommendation information can be used to generate printed instructions for taking an olfactory test. For example, trial recommendation information may be compiled into a printed chart 106 of the olfactory test article 104, compiled separately as a different document, and/or the like. The user 105 may refer to the printed chart 106 to determine a next recommended trial based at least in part on the user's responses to previous trials as previously computed by the server 103.

In some embodiments, the responses to the trials of the user can be used to calculate or estimate the user's detection threshold. For example, in some embodiments the responses can be used to calculate parameters (such as detection threshold) of a threshold curve comprising data representative of a probability of response of the user to different concentrations of a stimulus. For example, for each trial, a user may respond "yes" or "no" depending on whether or not they detected a stimulus of the trial, and whether or not such detection (or lack thereof) leads to a "yes" or "no" response. According to some embodiments, completing the trials prompted by the instructions may result in a series of binary answers with a length equal to the number of trials performed so far by the user. For example, if the user answers "yes" to a first trial, "no" to a second trial, and "yes" to a third trial, the series of binary answers is: "yes" (for trial one), "no" (for trial two), "yes" (for trial three). As explained above, this series of binary answers can be looked up via stored trial recommendation information to determine a next trial a user should take, until sufficient information is obtained to estimate the user's odor detection threshold. As a result, at the end of the trials, the system may have obtained sufficient test information to estimate the user's odor detection threshold. For example, the system can have sufficient information about the values of parameters needed to determine and render a user's threshold curve such as a parameter representing the concentration at which "yes" and "no" responses are expected to occur with equal probability and a parameter representing the probability of "yes" to a blank trial, which would be an incorrect response.

Figure 2:
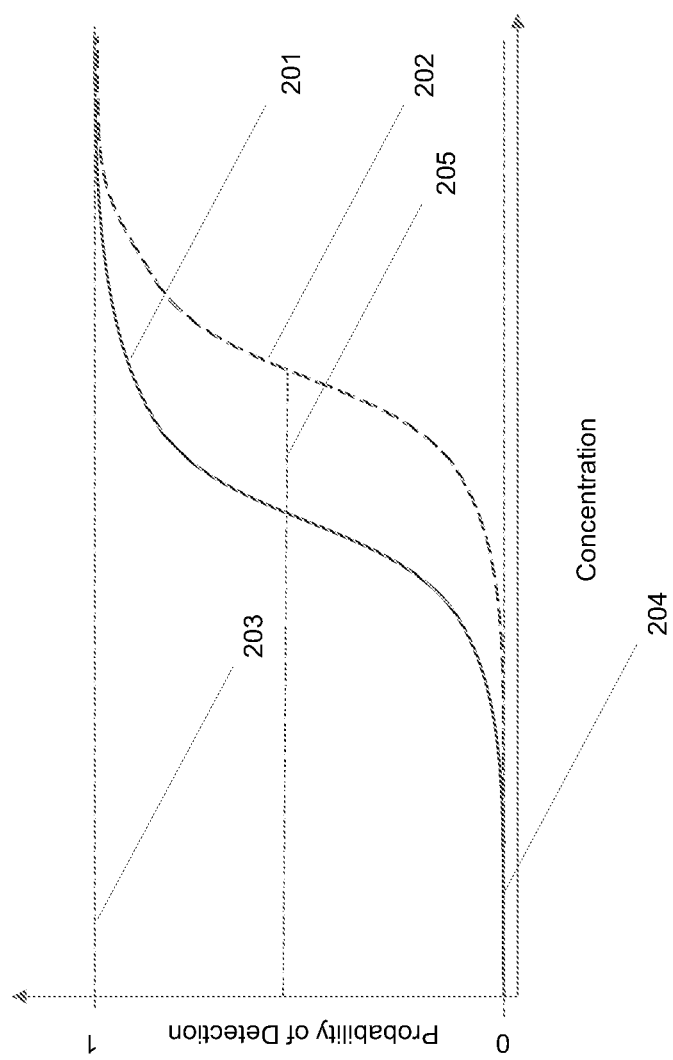
FIG. 2 illustrates a graph of exemplary curves representing a relationship between a concentration of a stimulus and a probability of detection, according to some embodiments.

For example, FIG. 2 shows exemplary data representative of threshold curve 201 and threshold curve 202. The threshold curves 201 and 202 may represent a relationship between concentration and probability of a "yes" response for two different users. For example, a concentration at which each threshold curve 201 and threshold curve 202 intersect with line 203 may represent a concentration of a stimulus for which a subject responds "yes" 100% (or substantially 100%) of the time. A concentration at which each threshold curve 201 and threshold curve 202 intersect with line 204 may represent a concentration of a stimulus for which a subject responds "yes" 0% (or substantially 0%) of the time. A concentration at which each threshold curve 201 and threshold curve 202 intersect with line 205 may represent a concentration of a stimulus that is indicative of a threshold of interest of the user. For example, this threshold may indicate a concentration at which a user responded "yes" 50% (or substantially 50%) of the time. In some examples, the threshold may be a concentration that gives a half-maximal response (such as the EC50 threshold). According to some embodiments, the concentration may be represented in a log scale. FIG. 2 shows the probability of a "yes" response as a function of concentration, but such a response probability may depend on both the probability of detection and upon the response criterion bias (probability of a "yes" given detection, and given no detection). For example, for some subjects, the probability of a "yes" may never fall below 20%—the bias of that subject is to response "yes" 20% of the time even when no stimulus is presented or detected. Accordingly, some of the disclosed embodiments may simultaneously estimate the threshold for detection and this bias.

Examples of parameters that can be used to compute a threshold curve can include various numbers of parameters. For example, the parameters can include two parameters, three parameters, etc. The parameters can include slope, concentration at which yes/no will occur with equal probability, the probability of an (incorrect) "yes" indicating the user sensed a blank trial (e.g., a false alarm rate), a concentration that gives a half-maximal response (e.g., the yes probability is halfway between false alarm rate and maximum probability), the maximum probability (i.e. to the strongest possible stimulus), the slope (e.g., the rate at which the threshold curve rises between the minimum and maximum). Additionally, a threshold curve may be computed using an exponent value defining a shape of the threshold curve.

As a result, it should be appreciated that the trials of the olfactory test do not need to indicate all parameters and/or all points of a threshold curve, rather just a sufficient number of trials may be needed to be performed in order to provide enough information regarding various trial concentrations and associated responses in order to estimate one or more parameters to determine the threshold curve.

In some embodiments, the system can be configured to estimate a threshold curve using various mathematical techniques, such as logistic regression (e.g., binomial logistic regression, multinomial logistic regression, ordinal logistic regression, etc.) using one or more different parameters (e.g., any of the parameters described herein). In some embodiments, other noise models such as Gaussian, Poisson, binomial, inverse Gaussian, and/or the like can be used.

According to some embodiments, regression can be implemented using penalties for certain kinds of estimates (e.g., non-sparse ones, e.g., techniques such as Lasso, Ridge Regression, or Elastic Net). In some examples, Bayesian estimates can also be made, using the data from the olfactory test outcome itself as the likelihood but also using a prior based at least in part on previous subjects or normative data.

In some embodiments, control trials (e.g., trials with no stimulus concentration) may be used to estimate a rate of false alarm for users. The false alarm rate can be used to determine a threshold curve. For example, one or two control trials can be included in a test article in order to help estimate a false alarm rate for each user. For example, a user who responds yes, indicating that they detected a stimulus in a trial that has no added stimulus may indicate a higher false alarm rate. This rate may cause the threshold curve of the user to have a probability of detection much higher than zero for smaller concentrations.

The parameters that are estimated for each threshold curve may include one or more of a total set of possible parameters used to compute the threshold curve (e.g., while other parameters are pre-computed, remain static, and/or held constant). In some embodiments, a threshold curve may comprise, for example, a "constrained" fit or model. For example, it may be desirable to focus on the portion of a user's threshold curve having a steepest slope, which may provide the most information about the user's odor detection threshold (e.g., compared to the intersection points with lines 203 and 204 as described above). In such examples, the slope may therefore be kept the same for each threshold curve, while the parameters are computed to determine (a) when a slope of the threshold curve is maximal (e.g., a steepest slope) and (b) the lowest point of where the threshold curve starts. For example, it can be desirable to determine where the slope of the threshold curve is maximal since if the threshold curve is shifted left, then the associated user has a better sense of smell compared to a user associated with a threshold curve that rises further to the right.

In some embodiments, a threshold curve may be estimated based at least in part on two parameters, referred to herein as a first and second parameter for ease of illustration but not intending to be limiting. In some embodiments, a first parameter may represent the concentration at which the slope of the threshold curve is maximal. In some embodiments, a second parameter may represent the probability of "yes" to a blank trial (e.g., no stimuli, no odor, etc.), which would be an incorrect response. The first parameter may indicate a positive horizontal shift of the threshold curve when the first parameter increases and may indicate a lower ability of the user to detect a stimulus. The first parameter may indicate a negative horizontal shift of the threshold curve when the first parameter decreases and may indicate a higher ability of the user to detect a stimulus. The second parameter may indicate the threshold curve starts at a higher probability when the second parameter increases and may indicate that the user is more likely to respond to a blank (i.e., respond "yes" to indicate detection of a stimulus). The second parameter may indicate the threshold curve starts at a lower probability when the second parameter decreases and may indicate that the user is less likely to respond to a blank. The second parameter may have an effect resembling dilation, with the maximum value of the threshold curve remaining constant.

An estimated threshold curve such as that described herein may be used to determine one or more measurements of odor detection threshold. For example, one measurement of a user's odor detection threshold can be estimated as the concentration at which a user exhibits a half-maximal response (i.e., halfway between the user's probability of response for no added stimulus or no odor and the user's probability of response for a maximal stimulus or maximal concentration of odor). In another example, one measurement of a user's odor detection threshold can be estimated as the threshold concentration at which the user's probability of response of detection of the concentration is fifty percent (e.g., such that the probability of detection is an average or midpoint between the probability of "yes" to a blank trial for a user and 100%). For example, for a first user, the threshold concentration may be higher or lower than a threshold concentration of a second user. In some embodiments, this threshold can subsequently be used, for example, by a computing device, to calculate a score or classify a user as Normosmic (e.g., normal sense of smell), Hyposmic (e.g., reduced sense of smell but still able to smell), or Anosmic (e.g., essentially incapable of smelling). For example, the threshold can be compared against normative data from sample tests to provide a clinical diagnosis into one of these three different categories. The clinical diagnosis may be empirically determined by comparing to one or more threshold values for the detection threshold, one or more other parameters defining the threshold curve, and/or through comparing to validated assessments of olfactory function.

In some embodiments, a user may be first directed to a trial of a label having a concentration corresponding to a mean detection threshold in the population. In some embodiments, for example, the mean detection threshold in population may be estimated to be substantially 1.0% v/v. In some examples, it may be another concentration as well, as the techniques are not so limited.

According to some embodiments, the disclosed stored information may include an entry for most and/or all of various possible orders that trials of an olfactory test can be conducted by a user and associated possible responses for those trials. Each entry, as described herein, can also include a recommended (or best) next trial to perform based at least in part on its associated unique series of trials and trial responses. The techniques can include pre-computing the next recommended trial for each possible order of trial outcomes within a test, such that for a given series of responses, there is a deterministic next recommended trial. For example, for a test article with eight trials, in which a binary outcome of each trial determines the identity of the next trial, there can be two hundred and fifty-six possible series of yes/no responses to the trials.

In some embodiments, the disclosed software application can be pre-programed with stored information to quickly provide recommendations for most and/or all of order of trials and associated responses (e.g., in order to guide a user through an olfactory test in real time). For example, a server or any computing device may calculate, for most and/or every possible series of trials and responses, a next trial of remaining trials a user should perform given response outcomes of previous trials already performed by the user.

In some embodiments, for each series of trials and associated responses, a next recommended trial can be determined by computing which of the remaining trials a user should perform based at least in part on information required to estimate a user's odor detection threshold. For example, if using a parameterized curve, the associated next trial can be determined by minimizing the uncertainty of one or more parameters estimating a curve representing the user's ability to smell. For example, for each series of trial responses, for every remaining trial that is available for the user to perform, the system can compute both the mean and the standard error for the parameter(s) being used to describe and/or estimate the parameterized curve (e.g., the first and second parameters, discussed above). For each remaining trial, the expected value of the standard error of the parameter estimates upon completion of the trial (e.g., representing a current estimate of probability of detection of stimulus multiplied by the estimated standard error when the user responds detects stimulus (e.g., the user responds yes) summed with the value of the product of the probability of the user not detecting the stimulus (e.g., the user responds no) and the standard error when the user does not detect the stimulus) is calculated and the trial of the remaining trials that minimizes the expected standard error is chosen as the recommended trial. In some embodiments, alternatively and/or additionally, the trial may be chosen as the recommended trial that minimizes a mathematical model, such as the recommended trial that minimizes the entropy of a probability distribution for one or more parameters, minimizes a Kullback-Leibler divergence between the current distribution and another distribution, minimizes a function of a Bayesian posterior distribution estimate, or minimizes a function of an estimated covariance matrix of the parameters, and/or the like.

In some embodiments, olfactory test responses are determined based at least in part on an adaptive test design, such as a Bayesian adaptive test design. For example, an olfactory test can be designed with trials that include concentrations that span a range of concentrations. A software application can be designed to compute recommended next trials in a manner that prompts the user to perform trials that are most informative about them as a person. As a result, based at least in part on their last response, the software application can determine what the next response should be. For example, if the user doesn't smell a trial with a low concentration, the software application can be designed to determine a recommended next trial that has a higher concentration. Similarly, if the user smells a trial with a higher concentration, the software application can be designed to determine a recommended next trial that has a lower concentration. As a result, based at least in part on the user's individual responses, the application can guide the user through an olfactory test in a manner that uses trials that help narrow down a concentration range as much as possible for the specific user to get enough measurements to estimate the threshold curve.

For example, a user may respond "yes" to a trial corresponding to a label of concentration of 1% PEA, and then "no" to a trial corresponding to a label of concentration of 0.01% PEA. The software application may estimate the parameters under a plurality of combinations of outcomes that includes the labels and responses for these two trials and one additional trial (at each possible concentration) and corresponding possible response (e.g., "yes" or "no") for every remaining trial. For example, if there are eight (8) possible concentrations and two (2) possible responses, the software application may estimate the parameters for 16 potential outcomes.

In some cases, one or more outcomes will turn out to be uninformative. For example, if the user has already said "yes" to 1% PEA, it is likely that they will say "yes" to 10% PEA (and the software application may estimate this probability to be high, based at least in part on the first two responses), and this outcome may do little to reduce uncertainty in the estimate for the threshold parameter. This may mean that the standard error for this parameter will not be as low as it might be for some alternative outcome.

By contrast, if the next trial is for 0.1% PEA, the response may be quite informative, because it is uncertain (based at least in part on the first two responses) how the user might respond. Both a "yes" and a "no" would each help reduce uncertainty in the threshold parameter.

In some embodiments, blank concentrations may also be considered in every trial. For example, a user may response "yes" to both 1% PEA and 0.01% PEA. If the user responds "yes" to the blank, it may reduce uncertainty in the false alarm rate parameter. If the user responds "no" to the blank, it may reduce uncertainty in both the false alarm rate and threshold parameters, providing evidence that the threshold is likely to be below 0.01% PEA.

As described herein, a user device can provide an interface that guides a user through performing an olfactory test. In some embodiments, the device may be configured to receive, from the user, a plurality of responses indicating whether or not the user detects one or more stimuli for a trial. In some embodiments, the user device may be configured to receive responses through user input via a display of the user device. For example, FIG. 3A presents an exemplary image of mobile device 101A that includes a display 300. The display 300 may include a prompt 301 to the user. The display 300 may further include options to the user for response. For example, the user may select 'yes' 302A and 'no' 302B to indicate whether or not the user detected the one or more stimuli associated with the "label 12" trial.

FIG. 3B presents an exemplary image of a display on a device configured to display an instruction to a user for performing a next trial, according to some embodiments. As described herein, the system can determine the next trial and the instruction may be displayed to the user to instruct the user to perform the determined next trial. For example, the mobile device 101A can display on the display 300 a generated instruction 303 that prompts the user to lift a tab associated with "label 7" to perform trial 2 (e.g., after which point the user may be prompted with an interface as discussed in conjunction with FIG. 3A to request the user to provide a response for "label 7").

FIG. 3C presents an exemplary image of a display on a device configured to display another instruction to a user, according to some embodiments. For example, the device 101A may prompt the user to reseal a label after performing the trial. For example, the user can be prompted to first lift a label for a trial (e.g., as discussed in conjunction with FIG. 3B), to then perform the trial and enter their results (e.g., as discussed in conjunction with FIG. 3A), and then to reseal the label of the trial. The process can be repeated for each trial that the user performs for an olfactory test, until complete.

Figure 4A:
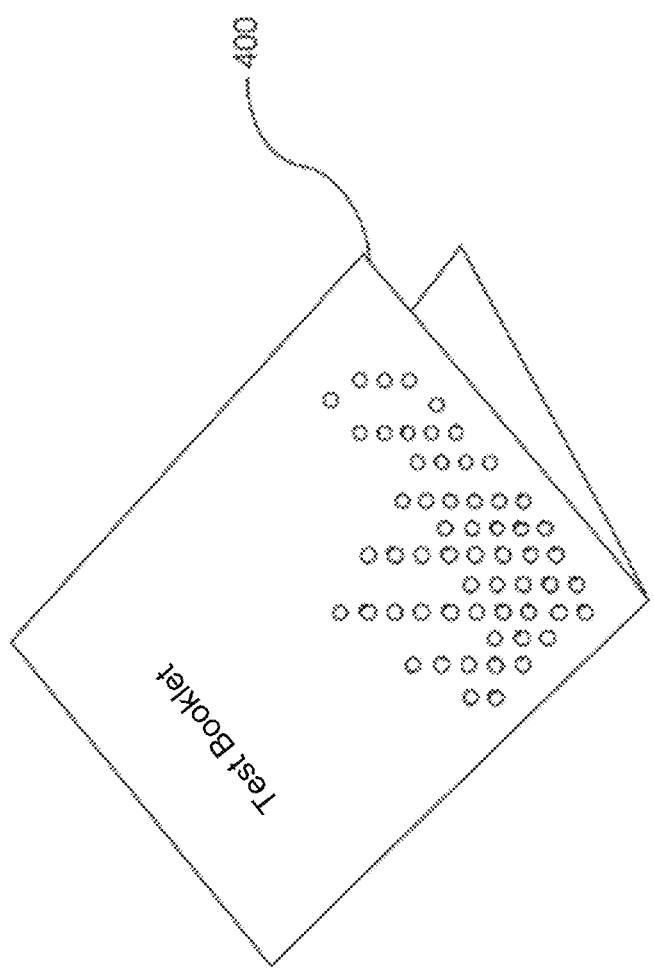
FIG. 4A illustrates an exemplary image of a booklet including trials for the olfactory test, according to some embodiments.
Figure 4B:
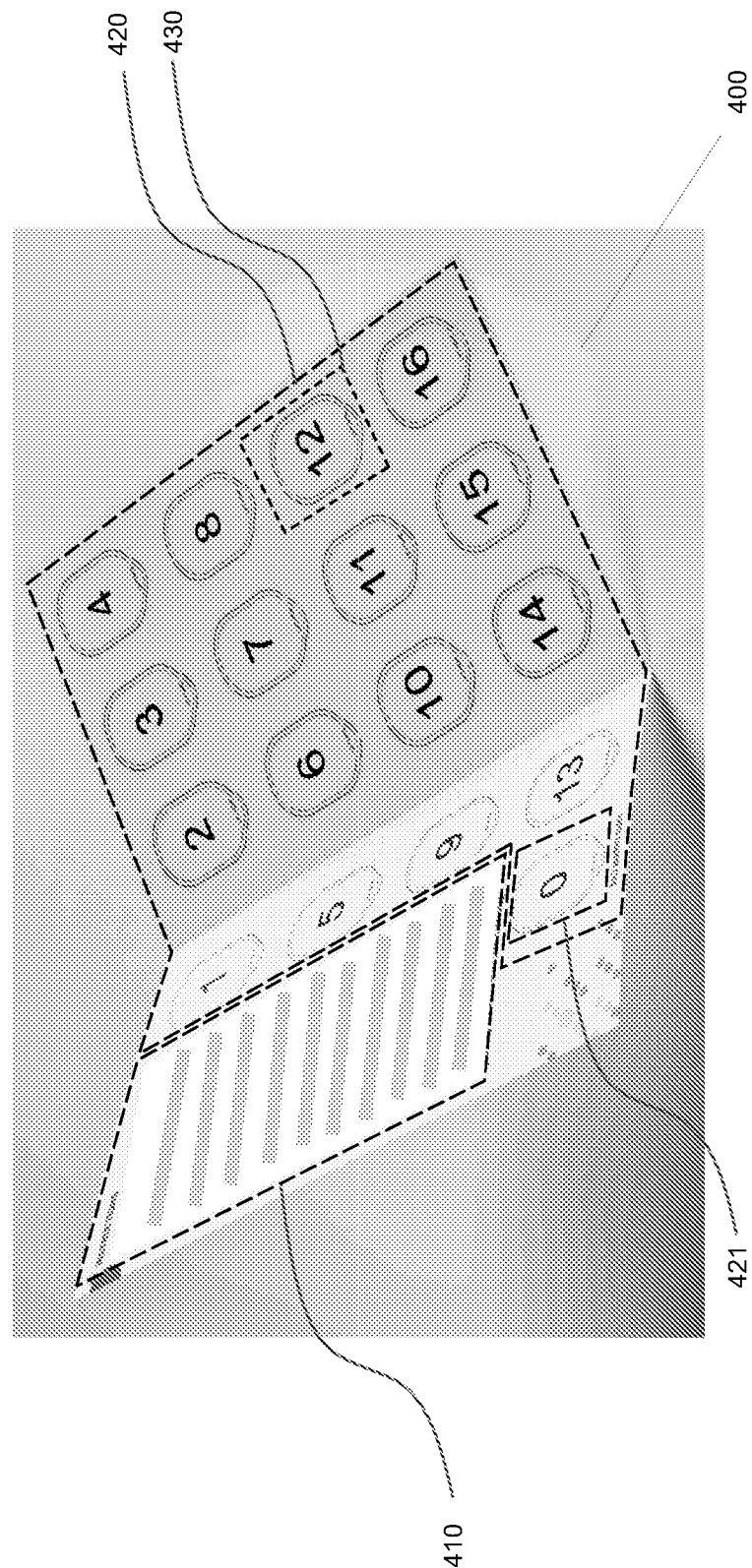
FIG. 4B illustrates another exemplary image of a booklet including trials for the olfactory test, according to some embodiments.

FIG. 4A presents an exemplary image of an outer portion of a booklet 400 including trials for an olfactory test, according to some embodiments. FIG. 4B presents an exemplary image of the inside portion of booklet 400 showing the trials for the olfactory test, according to some embodiments.

The booklet 400 includes a section 410 indicating instructions for how to perform trials (e.g., which can instruct the user how to download and/or run software that is configured to guide the user through the olfactory test as described herein). The booklet 400 also includes section 420 including the trials of the olfactory test.

In some embodiments, the olfactory test may include one or more trials having no odorant or added stimulus. For example, section 421 of the booklet 400 indicates a control '0' label having no concentration of an odorant. In some embodiments, the control '0' label may not be included in a trial and the user may not be prompted for a response in response to the control label '0'. Of the remaining trials '1' through '13' there may be included one or more trials having no stimulus. According to some embodiments, there may be a plurality of trials (e.g., 1 or 2 trials) having no odor or added stimulus.

As described herein, the trials may include one or more olfactory stimuli (e.g., odorous substance, such as an odorant, odorant mixture, molecule, compound, etc.) at a variety of different concentrations and/or ranges of concentrations. In some embodiments, a single odorant is used at different concentrations and/or ranges of concentrations. In one example, the trials include phenyl ethyl alcohol (PEA) at different concentrations. In another example, the trials include 1-butanol at different concentrations and/or ranges of concentrations. In some examples, other odorants may be used (e.g., beta-ionone, rotundone, androstenone, or any clear trigeminal stimulant). In some embodiments, a mixture of one or more odorants may be used at different concentrations and/or ranges of concentrations. It should be appreciated that various molecules, compounds, mixtures of multiple compounds (e.g., essential oils), and/or the like can be used with the techniques described herein, which are not so limited. In some embodiments, the trials of a particular olfactory test can include a plurality of different odorants at one or more concentrations, and therefore it should be appreciated that while some examples described herein are described with reference to an olfactory test that uses different concentrations of a single odorant, two or more odorants can be used with the techniques described herein.

In some embodiments, performing a trial may include unsealing (e.g., peeling, lifting, etc.) a tab, detecting/not detecting one or more stimuli, and/or subsequently resealing the tab. In some embodiments, performing a trial may include scratching a location and sniffing the location to detect/not detect one or more stimuli.

Figure 5A:
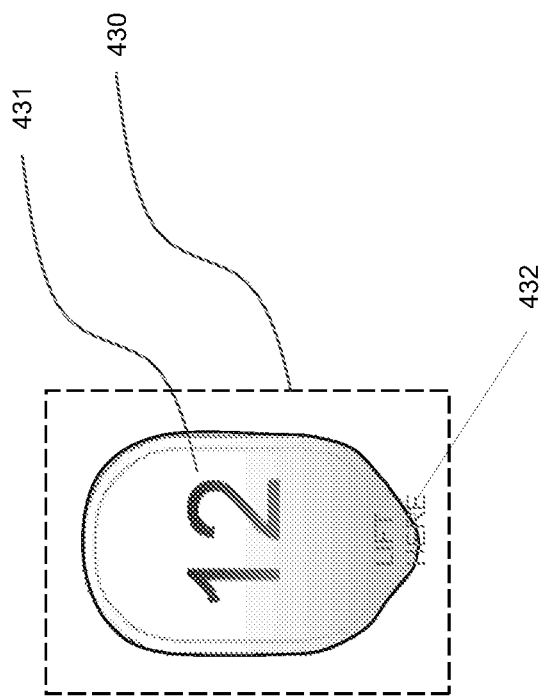
FIG. 5A illustrates an exemplary image of a trial, according to some embodiments.

For example, FIG. 5A presents an exemplary image of trial 430 of FIG. 4B that is sealed, according to some embodiments. The trial 430 may include tab 432 that may be peeled or replaced to unseal and reseal. The trial may also include an identifier 412, that may distinguish a trial from other trials of the olfactory test. In FIG. 5A, the identifier is a number '12', however, the identifier may be a character, a symbol, and/or any distinguishing physical marker.

Figure 5B:
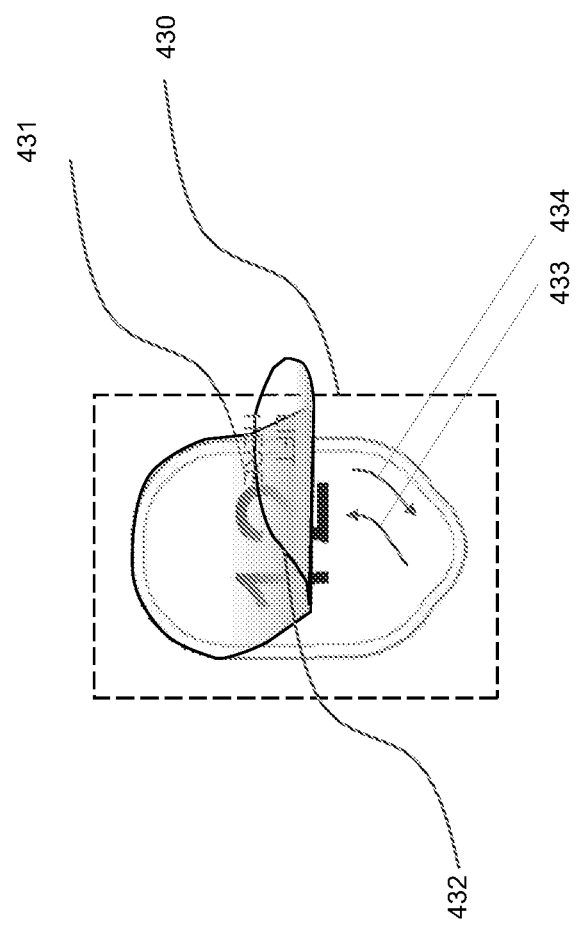
FIG. 5B illustrates an exemplary image of an unsealed trial, according to some embodiments.

The sealed tab 432 may be unsealed by lifting and/or peeling the tab 432 in a first direction and subsequently resealed by replacing the tab 432 in a second direction (i.e., in a substantially opposite direction of the first direction). For example, FIG. 5B presents an exemplary image of a peeled trial 430, according to some embodiments. The tab 432 may be peeled back in a first direction 433 to unseal the tab 432. The tab 432 may subsequently be sealed in a second direction 434.

Each label may include a stimulus of a predetermined concentration, such as a percentage or approximately a percentage of the concentration (e.g., within 5% or ten % of a desired concentration). The concentrations can range between no stimulus (e.g., a control) to a substantially high concentration, such as approximately 60%, 70%, 80-100%, 100% volume per volume (v/v), and/or the like. In some examples, exemplary concentrations may be, for example, 0.01, 0.0001, 0.00032, 1 e-20, 0.001, 0.1, and 0.32% v/v, and/or the like. In some examples, the concentrations may include 0, 0.01, 0.03, 0.1, 0.3, 1, 3, 10, 30% v/v, and/or the like. The concentrations may also be measured in ppm or ppt (parts-per notation) or a like concentration measurement, for example, 0.020, 0.063, 0.2, 0.63, 2, 6.3, 20 parts per trillion, and/or the like.

According to some embodiments, the distinct predetermined concentrations of the labels may be chosen to cover a range of concentrations using different increment factors. For example, in some embodiments, the concentrations of the labels may cover the range using an increment factor of substantially a half log, quarter log, third log, etc. For example, using half log increments, a second lowest concentration can have a log concentration that is substantially 0.5 higher than a log concentration of the lowest concentration. According to some embodiments, the set of concentrations may remain the same, but each concentration of the set may be chosen to be labelled as a random label. In an illustrative example not intended to be limiting, as shown in FIG. 4B the olfactory test can include seventeen trials numbered '0' through '16' (which identify a trial, rather than the order in which the trials are conducted, as discussed herein), with different concentrations configured according to the techniques described herein (e.g., including some trials with no concentration for control).

Exemplary System Operations

Figure 6:
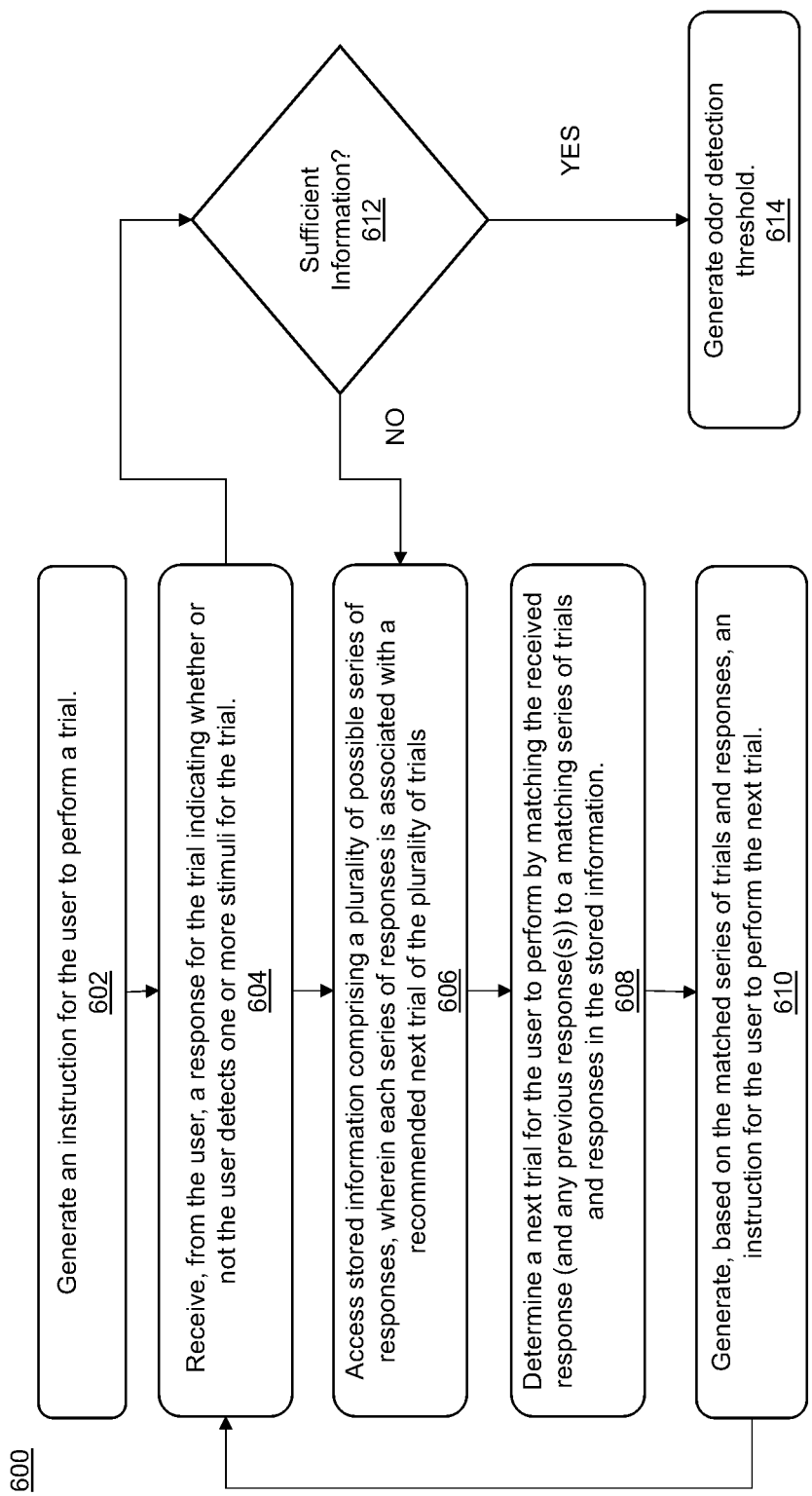
FIG. 6 illustrates a flowchart of an illustrative process for processing responses of an olfactory test, according to some embodiments.

FIG. 6 presents a flowchart of an illustrative process 600 for guiding a user through an olfactory test and processing responses of the olfactory test, in accordance with some embodiments of the technology described herein. One or more steps of illustrative process 600 may be performed by one or more suitable device(s) and, for example, may be performed by a computing device such as mobile device 101A, computer 101B, or using a printed series of instructions generated based at least in part on the computed test information, and/or the like.

At step 602, the computing device provides the user with instructions to perform a first trial of the olfactory test. The instructions to perform the first trial may include rendering text and optionally graphics on a user interface of the computing device directing the user to, for example, a first one of a plurality of trials on an olfactory test article. In some embodiments, the first trial may always be the same first trial for each user, and then the olfactory test procedure branches for each user depending on their response. In some embodiments, while not shown in FIG. 6, a user may be instructed to perform a pre-test trial where the user is instructed to smell a certain concentration of the stimuli to familiarize themselves with the olfactory test.

At step 604, the computing device receives from the user via an input device data representative of a response for the first trial. The response may comprise data representative of an indication of whether or not the user detected one or more stimuli for the first trial. For example, as described above, the user may enter "yes" to indicate that the user can detect (e.g., can smell) the stimuli for the trial, or "no" to indicate that the user cannot detect (e.g., cannot smell) the stimuli.

After step 604, the computing device can be configured to determine whether the received response provides sufficient information needed to calculate the user's odor detection threshold. At step 612, the computing device determines whether the computing device has sufficient information to determine the user's odor detection threshold. If not, then the method can continue to step 606 to determine which trial to recommend next to the user.

At step 606, the computing device accesses stored test recommendation information as described herein that includes various possible series of responses to trails, wherein each series of responses is associated with a recommended next trial of a plurality of trials associated with the olfactory test. The stored information may be stored on a server, such as server 103 of FIG. 1. The stored information may be accessed by the computing device, for example, locally and/or via one or more networks 102.

At step 608, the computing device determines a next trial for the user to perform by matching the data from the user to a matching series of trials and responses in the stored information. As described herein, the computing device can guide different users to perform different trials based at least in part on the user's responses.

Figure 7:
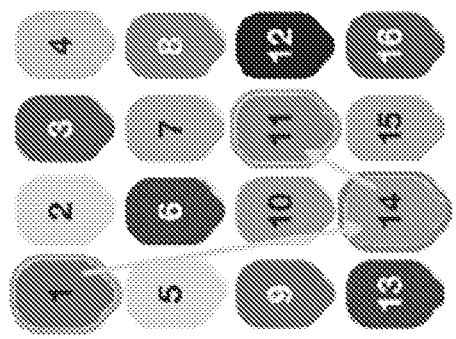
FIG. 7 illustrates a diagram of an exemplary series of trials, according to some embodiments.

At step 610, the computing device generates, based at least in part on the matched series of trials and responses, an instruction for the user to perform a next trial based at least in part on the matched series of trials and responses. Generating the instruction for the user to perform the next trial may include rendering text and optionally graphics on the user interface of the computing device directing the user to, for example, another one of a plurality of trials on an olfactory test article that has not be performed. At that point, the method 600 proceeds back to step 604 to receive the user's input for the next trial, and to process it accordingly. The computing device can therefore keep track of trials performed by the user and the associated responses for each trial. Thus, when the computing device receives a new response for a new trial, the computing device can add that information to any previously conducted trials, and use a full set of responses (or a subset, as necessary) to search for a matching series of trials and responses in the stored information. For example, a first user may be matched to trials including "label 1" (first trial), "label 10" (second trial), and "label 14" (third trial) in response to trial responses received from the first user, while a second user may perform trials including "label 1" (first trial), "label 4" (second trial), and "label 8" (third trial) in response to trial responses received from the second user. FIG. 7 presents a diagram of an exemplary series of trials the user may perform according to the generated instruction.

Figure 8B:
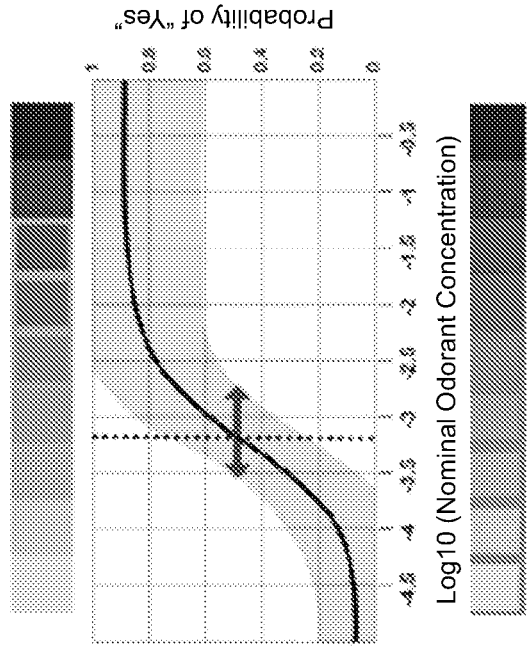
FIGS. 8A and 8B illustrate representations of a user's odor detection threshold, according to some embodiments.
Figure 8A:
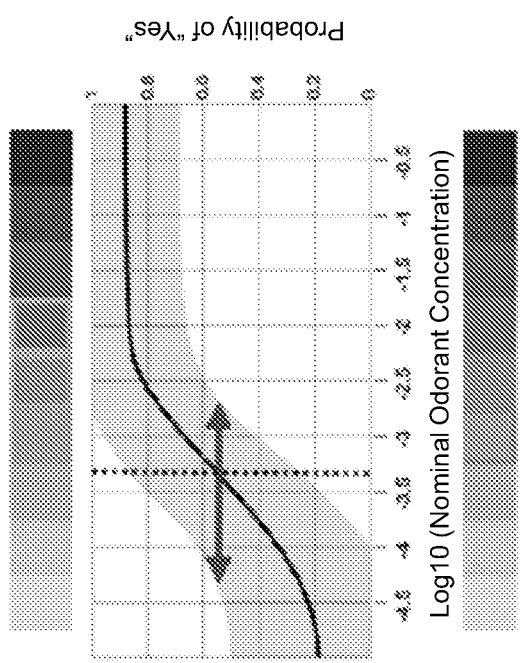

Referring back to FIG. 6, at step 612, if the computing device determines that the computing device has sufficient information to determine the user's odor detection threshold (and thus no further trials need to be performed by the user), the computing device proceeds to step 614. As an example, FIG. 8A is representative of the user's odor detection threshold comprising a curve that estimates the probability of a "Yes" response at all concentrations. The solid line of the curve may represent a point estimate for the curve, and the shaded region may represent the uncertainty (standard error). The odorant concentration at a "Yes" response probability halfway between the estimated minimum and maximum of that probability may be identified as the threshold (vertical dashed line), and the uncertainty in this value may be represented with the arrow.

In some embodiments, sufficient information determination may be based at least in part on the uncertainty represented by the arrow. As such, the computing device may continue to determine next trials until the uncertainty is reduced to a predetermined threshold. For example, referring to FIG. 8B, the same user may complete an additional five trials in the same test. With this increased number of responses, the estimated curve (and threshold) has shifted, and the uncertainty has been substantially reduced, and the computing device may proceed to generate an odor detection threshold for the user.

Referring back to FIG. 6, at step 614, an odor detection threshold is generated based at least in part on data representative of a plurality of responses, each response indicating whether or not the user detects one or more stimuli for a trial of a plurality of trials of the olfactory test article. In certain embodiments, data received and associated with performed trials and responses may be processed by the computing device or transmitted to a remote server to generate the odor detection threshold. The odor detection threshold may comprise a measurement based at least in part on one or more parameters based at least in part on the plurality of responses. A visualization or representation of the odor detection threshold may be rendered and displayed by the computer device on the user interface. For example, an odor detection threshold curve representative of the ability of the user to smell the stimuli on the olfactory test article can be displayed on the user interface. In certain embodiments, the odor detection threshold curve may be displayed along with a comparison odor detection threshold curve, such as that of one or more other users.

Example Experimental Implementation of Various Embodiments

The disclosed olfactory test can be used as a rapid olfactory screening test to capture variation in detection thresholds in individuals without active COVID-19. Using the disclosed olfactory test, differences were observed in estimated detection thresholds between sex and age groups, highlighting the ability of the disclosed olfactory test to reproduce expected population level findings that are consistent with other studies, as well as demonstrating its ability serve as a portable and rapid smell test. This is highly advantageous compared to other olfactory assessments that take longer to complete and have portability limitations. In a field-based convenience sample, no evidence was found to suggest detection thresholds differ between participants who report a history of COVID-19 and matched controls who did not. However, these tentative null results may require confirmation in a study specifically designed to explore this question. Collectively, experimental results suggest that the disclosed olfactory test is able to reproduce sex and age effects previously observed with more time-intensive testing methods.

As described above, the disclosed olfactory test may comprise a card-based article that is paired with an adaptive Bayesian software application, e.g., delivered via a mobile device application, to rapidly guide users through a task that delivers specific stimulus concentrations that can be maximally informative in determining an estimate of the odor detection threshold for that individual. To test the performance of the disclosed olfactory test, it was deployed among a group of individuals without active COVID-19 who were attending the two-day 2021 Twins Day Festival in Twinsburg, OH.

TABLE 1

Table 1: Participant demographics for ArOMa-T Twins Day study after data cleaning

| Sex | |
| --- | --- |
| Male | 159 |
| Female | 375 |
| Race/Ethnicity | |
| White | 459 |
| Black/African American | 35 |
| Amer. Indian/Alaska Native | 5 |
| Hispanic/Latino | 4 |
| Other | 6 |
| Prefer not to answer | 5 |
| Did not answer | 20 |
| Age (mean ± SD) in years | 39.2 ± 15.7 |

The protocol was approved by the local Institutional Review Board for the Monell Chemical Senses Center (IRB protocol #: 843798), and the study followed the principles of the Declaration of Helsinki. Per University of Florida requirements, an additional protocol was approved to receive and analyze anonymized aggregate data (IRB protocol #: IRB202102968). Participants were recruited, consented, and enrolled at a tent managed by the Monell Center in Twinsburg, OH; 595 participants enrolled in the study between August 7th and Aug. 9, 2021. All participants provided informed consent electronically. Demographic characteristics of participants (n=534; 29.8% male and 70.2% female; mean age 39.3) are summarized in Table 1. The cohort was predominantly female and white, with a mean age of 39.2 years (±standard deviation of 15.7 years) and median age of 34.1.

Some participants were excluded from the analyses. Reasons for exclusion included: having an indeterminate threshold from inconsistent response patterns (n=35). Because of the very small number of participants who did not indicate sex as male or female (n=4), they were excluded from the analysis. The participant pool was highly age diverse and participants were classified into three age bins of equal size (in years) for analyses: young (18-37 years), middle aged (38-57 years), and older (58-77). Participants (n=22) who were younger than 18 years or older than 78 years were excluded from the analysis. This resulted in a final dataset of 534 unique individuals; of these, 78 participants (~15%) reported a prior COVID-19 infection. For participants reporting positive COVID-19 history, no data on elapsed time between testing and COVID-19 were collected. Also, a subset of participants (n=97) at the Twins Day Festival returned the next day to repeat the test; these data were used to calculate an initial estimate of test-retest reliability using Pearson's R.

Because testing took place at the Twins Day Festival, demographics were enriched in twins and triplets. Of the 534 individuals included in the final data set, 180 were sets of twins (n=360 individuals). Of these twin sets, 143 were monozygotic pairs (n=286 individuals) and 37 were dyzogotic pairs (n=74 individuals). Falconer's formula for broad-sense heritability ($H_b^2=2*(R_{mz}-R_{dz})$) was used for a heritability estimate. Uncertainty was calculated by applying the Fisher transformation to Pearson correlations and propagating variance through the calculation (19).

An exemplary embodiment of the disclosed olfactory test article was used comprising a bi-fold card with graphics on the outside and user instructions along with 17 elliptical Scent-a-peel™ peel-and-burst labels (Scentisphere LLC; Carmel NY) containing an odorant inside the folded card. The labels in the disclosed olfactory test article tested contained various concentrations of the floral odorant PEA embedded in a proprietary encapsulation matrix. This odorant is used widely in smell testing, including in commercial smell tests marketed by Sensonics International (UPSIT; Haddon Heights, NJ) and Burghart GmbH (Sniffin' Sticks; Holm, Germany). PEA does not activate the trigeminal nerve, so it is commonly used in odor detection threshold tasks, which do not require any recognition or familiarity of the stimulus name or associated odor. PEA also has abundant normative data. Each of the bi-fold cards contains three labels with no odorant, one label each of the lowest and highest odorant concentrations, and two each for the intermediate odorant concentrations. The interval between adjacent concentrations were half-log steps (i.e., 0.5 $\log_{10}$ units of concentration, or half an order of magnitude), and the range of concentrations was chosen to roughly span the range of normal human detection thresholds for PEA. In this version of the disclosed olfactory test article, the position of individual PEA concentrations was fixed and unknown to the participants.

The olfactory test also employed a Bayesian adaptive threshold estimation software application to determine which label the user should peel and sniff next. Before beginning the test, participants are asked to sniff label 0 (which has no added PEA) to familiarize themselves with the background odor of the card. They start the test by sniffing label 1, where two possible responses are considered: "Yes, I can smell it" and "No, I cannot smell it". All other 15 possibly-odorant-containing labels are then considered as potential choices for the next trial. The specific label selected by the software application is the one that is most likely to reduce uncertainty in the running estimate of the detection threshold parameter in the model, weighted by a prior probability of the "Yes" and "No" responses at the corresponding concentration. This is repeated recursively for all subsequent trials. Because this is very computationally demanding, as the complexity doubles with each additional trial, all possible paths were simulated in advance to generate a simple lookup-table that is used in the actual application in real time, using a simple web browser application on Apple iPads (9.7 in screen; Apple Inc, Cupertino CA). Thus, no internet connection or cloud-based processing was needed to run the software application, and test results were stored locally on the iPads. Upon completion, all sensory and demographic data were downloaded for analysis. For this study, only fully de-identified data were accessed.

Due to festival logistics and facilities, as well as COVID-19 pandemic-related safety concerns, all testing occurred outside at ambient temperature. Participants were seated at tables under outdoor canopies on an athletic field. Each participant was provided with an iPad containing the web application to gather demographics and to complete the threshold task. A staff member was available if the participant had questions or technical issues. First, participants entered responses to a few demographic questions, as well as questions on their health history. Next, they self-administered the smell test using the printed olfactory test article and the preliminary web application described above. Thus, using the iPad and the card, participants were able to self-administer the test.

Each participant was asked to first read the instructions printed directly on the card. They were then instructed to peel and sniff "Label 0," which contained no added odor to familiarize themselves with the smell of the card and blank label. Next, the software application directed the participant to a label containing an intermediate concentration of PEA and they were asked the binary question: Can you smell the scent (YES/NO). Based on this answer, the software application then directed the participant to a label containing a lower concentration of PEA (if the answer was YES) or a higher concentration of PEA (if the answer was NO), where they were again asked to peel the label, sniff, and answer the same YES/NO question. After each question, the software application directs the participant to another numbered label based on all prior YES/NO responses, which provides a preliminary estimate of detection threshold. Each subsequent response improves this estimate. Duplication of some odor concentrations and inclusions of blanks increases the likelihood of faithful responses and allows for criterion bias (e.g., false alarm rate) to be separated from olfactory ability. According to the embodiments disclosed herewith, a final detection threshold estimate may be determined from a maximum of eight samplings of odorant (and blank) spots. This design allows for a Bayesian adaptive threshold test optimized for speedy self-administration and reporting, and that selects the most informative odorant concentration on each trial.

Bayesian inference was used to estimate the parameters of a psychometric model, applying a weakly informative prior on the detection threshold ($\log(tau) \sim N(-3, 100)$) and on the decision criterion ($lambda \sim N(1, 0.5)$). Results reported here were robust to a wide range of choices for the mean and variance of the prior, including the lack of a prior (i.e., non-Bayesian inference). Theoretical considerations including biological limits on detection threshold motivated our decision to use a weakly informative prior, as did simulated data checks showing more accurate estimation of model parameters and test/retest reliability in synthetic datasets.

Data were analyzed in Python (version 3.8) and R using RStudio software (Version 2021.09.0). Detection threshold estimates were determined in accordance with the ASTM International (formerly American Society for Testing and Materials) Method E679-19 ("Standard Practice for Determination of Odor and Taste Thresholds by a Forced-Choice Ascending Concentration Series Method of Limits"), with minor modifications as described below. Of the 534 participants tested, 66 participants reported "YES" for all PEA containing labels, and "NO" to all blanks they received; their estimated thresholds were imputed with values slightly below the lowest concentration included in the olfactory test articles, in accordance with the standard ASTM E679 decision rule. The specific value used here was $-4.5 \log_{10}$ units.

At the other extreme, 23 participants reported "NO" for all concentrations presented; again, following the standard ASTM E679 decision rule, these individuals had their estimated threshold set to a value just above the highest concentration available on the olfactory test article. The specific value used here was $0.5 \log_{10}$ units. The seven individuals with values thresholds between 0 and $0.5 \log_{10}$ units have substantially elevated threshold estimates that were successfully fit by the model (i.e., these values reflect their estimated threshold based on a minimal number of YES responses, rather than imputation via an a priori decision rule).

A three-way mixed model analysis of variance (ANOVA) was performed to determine if estimated odor detection threshold differed by sex or age group. This was followed by a post-hoc comparison with Tukey's HSD ($p<0.05$) to determine where any group differences occurred.

With this convenience sample of participants, this study was not specifically designed or implemented to compare those who experienced a past COVID-19 infection to those who did not; still, the incidence of a prior COVID-19 diagnosis was sufficient to undertake an unplanned exploratory analysis. Participants were not recruited to enrich the sample with COVID-19+ and COVID-19- individuals.

Given that only 78 of our participants (~15%) had a positive self-reported history of COVID-19, propensity matching was used on the participants who indicated they experienced past COVID-19 infection to identify comparable controls without a positive history of COVID-19. Using the MatchIt package in R, participants were matched based using age, sex, and self-identified racial category, thereby generating two equally sized groups, each with 78 participants. Due to sex and age group effects in the planned model, sex and age were included in an exploratory model testing the effect of positive COVID-19 history; due to the smaller sample size (n=156, versus 534 above), age was included in the model as a continuous variable, rather than age group.

A three-way mixed ANOVA was used to test whether estimated odor detection threshold differed by past COVID-19 status, adjusting for sex and age (as a continuous variable) followed by a post-hoc comparison using Tukey's HSD ($p<0.05$). In parallel, a two sample Kolmogorov-Smirnov (KS) test was also performed to test for differences in distribution shape.

Example Experimental Results of Various Embodiments

In a non-laboratory setting with an age diverse set of participants, the mean time to complete the olfactory test was $2.8 \pm 0.9$ min, inclusive of time needed to read the instructions. Individual trials—i.e., sniffing a label and answering a single YES/NO question-took an average of $11.6 \pm 2.8$ sec. The false alarm rate for the olfactory test (answering "YES" to the first blank presented) was 7.5%, while the rate of answering incorrectly to two blanks was 2.6%. A subset of participants (n=97) retook the olfactory test the following day. For this subgroup, a Pearson's R of 0.61 was found, comparable to the published test-retest reliability of 0.58 for another rapid olfactory measure, the NIH Toolbox Odor Identification Test (Toolbox OIT).

There was a main effect of sex on estimated odor threshold measured with the olfactory test [$F(1,528)=15.97$; $p<0.0001$]. Female participants showed a detection threshold that was $\sim0.50 \log_{10}$ units ($\sim3.2\times$) lower (i.e., more sensitive) than males: $-2.31$ versus $-1.81$, respectively. There was a greater percentage of females (15.5%) than males (5.0%) with the lowest measurable detection threshold ($-4.5 \log_{10}$ units).

There was a main effect of age-group on estimated odor threshold [$F(2,528)=15.32$; $p<0.0001$; FIG. 4b]. In Tukey's HSD ($p<0.05$), the youngest participants (18-37 years) had a lower mean threshold estimate compared to participants in oldest group (58-77 years). The size of this difference was $\sim0.94 \log_{10}$ units (a $\sim8.7\times$ difference in concentration). The participants in the second age bin (38-57 years) had a lower mean threshold estimate compared to participants in oldest group (58-77 years). The size of this difference was $\sim0.61 \log_{10}$ units (a $\sim4.1\times$ difference in concentration). There was no evidence of an interaction between sex and age-group [$F(2,528)=0.32$; $p=0.73$].

The ANOVA model testing for an effect of positive COVID-19 history on smell threshold revealed no association that the cases and matched controls may differ in terms of threshold [$F(1,152)=0.11$; $p=0.74$]. Specifically, the mean threshold estimate of participants without a past history of COVID19 was −1.96±1.46, compared to −1.88±1.30 for participants who reported a prior COVID-19 infection, a nominal difference of ~0.08 log units (~1.2× difference). Likewise, the distributions of estimated detection threshold in participants who had COVID-19 versus those who did not, also showed no association of a difference (KS test statistic=0.09; p=0.91). Collectively, these exploratory analyses provide no evidence that odor thresholds are elevated in a convenience sample of individuals who have recovered from acute COVID-19.

The large number of both monozygotic and dizygotic twins in our sample allowed a preliminary estimate to be conducted of heritability for detection threshold. Dizygotic twins exhibited weak correlation in estimated detection thresholds (R=0.19±0.16), while monozygotic twins showed a stronger correlation (R=0.46±0.07). Using Falconer's formula (see Methods), a broad-sense heritability of $H^2$=0.55±0.36 was estimated.

The primary goal of this study was to assess the ability of a novel smell test, the disclosed olfactory test, and to determine an odor detection threshold in individuals in a non-clinical setting. Tests for odor detection thresholds are intended to estimate the minimal perceptible concentration of a stimulus. While the exact estimate depends on the specific psychophysical method used to operationally measure the threshold, threshold-based assessments have substantial advantages over other measures of olfactory function as they avoid issues of prior familiarity, memory recall, and naming ability. Still, threshold-based methods also tend to be extremely slow to administer, and thus are often avoided in lieu of other methods in settings where time is at a premium (i.e., clinical visits).

The disclosed olfactory test was found to be a fast, easy to use, field-deployable test. Over 500 participants were able to complete the test despite its being administered in an outdoor, festival setting. The median time to complete the disclosed olfactory test—under three minutes—compares favorably to commercially available smell tests like the UPSIT and Sniffin' Sticks, which can take 8 or more minutes to complete. When participants were presented with two blanks (versus one), the false alarm rate—the fraction of participants who responded YES to all blanks—was dramatically reduced from 7.5% to 2.6%. In future studies or in clinical use, it will be trivial to adjust the software application to require multiple blank trials for every participant. Further, with a Pearson's R of 0.61, the test-retest reliability of the disclosed olfactory test is comparable to other validated self-administered rapid smell tests, such as the NIH Toolbox Odor Identification Test (Toolbox OIT), which has a test-retest reliability of 0.58. The Pearson's R observed here for the disclosed olfactory test suggests that this test is both reliable (i.e., it provides an accurate representation of a participant's performance across testing sessions) and internally valid.

This study recapitulated well-known sex differences in odor thresholds that show females have higher olfactory sensitivity when compared to older individuals and males, respectively. It was found that female participants had lower average odor detection thresholds than male participants, which is consistent with previous studies. Women have consistently been shown to be more sensitive than men for many odorants, including 1-butanol, 1-hexanol, and 1-octanol. While there is no definitive explanation for the common observation that females show superior olfactory performance than males, hormone interactions of sex hormones with the olfactory system have been suggested. Separately, women may have higher ability to pick up odors from a multitude of external stimuli, known as odor awareness. Last, it has been suggested previously that the rate of olfactory decline is greater among men and that men may be more prone to harmful occupational exposure to toxic compounds that can damage the olfactory system. Regardless of the underlying reasons for these sex differences, however, it is clear that the disclosed olfactory test has sufficient sensitivity to discern expected sex differences.

Compared to previous studies, it was found that average odor detection thresholds increased with age. Notably, younger participants were more likely to exhibit the lowest odor detection thresholds. The higher average odor detection thresholds seen in the oldest participants for this study is consistent with previous studies that found about half of the U.S. population between the ages of 65-80, and about three-quarters over the age of 80, experience smell loss. The relationship between age and olfactory decline has been seen when only odor identification ability was assessed, or when odor identification, discrimination and detection threshold were all tested. Indeed, odor identification and threshold tests are both sensitive to age-related smell loss, consistent with present data gathered with the disclosed olfactory test.

While the studies noted above, including present data, show that smell function tends to decrease with aging, it should be noted this is not always the case. There are numerous reasons for smell loss (e.g., upper respiratory infections, head trauma), and the cumulative probability of damage increases with age. For example, while the incidence of head injury tends to be much greater in younger individuals (due to risky activity), the prevalence of older individuals with a history of prior head trauma is substantially greater, given that they have had many more years for such trauma to occur. Similarly, the likelihood of any single non-COVID viral infection causing smell loss may be quite low, but with aging, the cumulative probability of such loss increases. Separately, neurodegenerative diseases, such as Alzheimer's disease and Parkinson's disease, increase in prevalence with age and are known to cause smell dysfunction. Collectively then, the chance of experiencing a condition which may cause smell loss increases with age, but smell function itself doesn't necessarily decrease as one ages (in contrast to vision changes like presbyopia). However, it cannot be ruled out that the experimental data may also be biased against observing an aging effect, due to a "healthy worker effect." That is, because individuals at the Twinsburg festival in 2021 felt comfortable coming to a highly populated crowded festival where there was potential to catch COVID-19, it can be assumed that these participants, especially any older ones, were generally healthy individuals who felt as though their health would not be compromised by attending the festival and possibly contracting COVID-19. Accordingly, sweeping generalizations about aging cannot be made from current data, as this study may have biased recruitment toward those with healthy aging.

Several recent studies have explored olfactory detection thresholds as a measure of smell loss due to current or prior SARS-CoV-2 infection. It was also reported that the majority of COVID-19 patients had impaired odor detection thresholds when tested with the Connecticut Chemosensory Clinical Research Center orthonasal olfaction test 15.6±4.3 days after a positive PCR test. Further, it has been reported that odor detection threshold scores from Sniffin' Sticks were more affected than scores for odor identification and discrimination in hospitalized patients with COVID-19 tested ~25 days after diagnosis. Collectively, these reports suggest detection threshold may be more affected by SARS-CoV-2; if confirmed, this might suggest some individuals with COVID-19 experience hyposmia that is missed with an odor identification task. Notably, the relation between subjective assessment of smell and controlled psychophysical testing remains highly contentious. Self-report can be subject to recall bias, and many with measurable loss may be unaware of this loss. On the other hand, measures of subjective loss or dysfunction may better capture quality of life issues, including dietary intake. Notably, qualitative disorders like parosmia and phantosmia can only be assessed via patient history and self-report, as no objective tests exist for these conditions. Present data conflict somewhat with some prior work, as no convincing evidence was seen that thresholds were elevated in those who had recovered from COVID-19; still, this was a small convenience sample of individuals without active COVID-19, and no estimate of the elapsed time between illness and olfactory testing was obtained; still, the small non-significant effect was in the expected direction, so additional work in larger cohorts with recruitment stratified by current COVID-19 status and/or past history is warranted to resolve these questions. The Disclosed olfactory test may be especially well-suited for such study designs, given that it is mailable, rapid, and suitable for field use.

CONCLUSION

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

The terms "substantive", "substantial", and "substantially" may be used herein to relate to around 5%, 10%, 20%, 50% and/or 80% in different embodiments.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based at least in part on any suitable technology and may operate according to any suitable protocol and may include wireless networks, wired networks or fiber optic networks.

The acts performed as part of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A computerized method for processing responses of an olfactory test performed by a user, the computerized method comprising:

receiving, by a computing device, data representative of a plurality of responses, each response indicating whether or not the user detects one or more stimuli of an olfactory test article, wherein the olfactory test article comprises a plurality of trials, wherein a trial of the plurality of trials comprises a sealable tab and a stimulus that is provided therewith;

accessing, by the computing device, stored information comprising a plurality of possible series of trials and responses, wherein each possible series of trials and responses is associated with a recommended next trial of the plurality of trials;

determining, by the computing device and for each of the plurality of responses, a next trial for the user to perform by (i) matching the data representative of the plurality of responses to a series of trials and responses of the plurality of possible series of trials and responses, (ii) determining, based on the plurality of responses, a parameter of an odor detection threshold that corresponds to a steepest slope, and (iii) determining a remaining number of trials for determining the odor detection threshold based at least in part on the parameter;

generating, by the computing device and for each of the plurality of responses, an instruction based at least in part on the next trial; and providing, by the computing device and to a user interface rendered by the computing device, a set of one or more trials from the plurality of trials in accordance with the instruction.

2. The computerized method of claim 1, further comprising:

generating a measure corresponding to the odor detection threshold based at least in part on the plurality of responses.

3. The computerized method of claim 1, wherein the one or more stimuli comprise one or more concentrations of one or more odorants.

4. The computerized method of claim 3, wherein the one or more odorants comprise phenyl ethyl alcohol.

5. The computerized method of claim 3, wherein the one or more odorants comprise at least one of: butanol, beta-ionone, rotundone, androstenone, or a trigeminal stimulant.

6. The computerized method of claim 1, further comprising:

determining a recommended next trial for each of the plurality of possible series of trials and responses by calculating an expected value and standard error of an estimate for a parameter of interest for each potential response to each of one or more unperformed trials of the plurality of trials; and storing the recommended next trial for each of the plurality of possible series of trials and responses.

7. The computerized method of claim 6, wherein determining the recommended next trial for each of the plurality of possible series of trials and responses further comprises determining a trial of the one or more unperformed trials that minimized the standard error of the estimate for the parameter of interest.

8. The computerized method of claim 1, further comprising:
classifying the user as normosmic, hyposmic, or anosmic based at least in part on the plurality of responses.

9. A device configured to process responses of an olfactory test performed by a user, the device comprising:
at least one computer processor; and
at least one storage device encoded with a plurality of computer-executable instructions that, when executed by the at least one computer processor cause the device to at least:
receive data representative of a plurality of responses, each response indicating whether or not the user detects one or more stimuli of an olfactory test article, wherein the olfactory test article comprises a plurality of trials, wherein a trial of the plurality of trials comprises a sealable tab and a stimulus that is provided therewith;
access stored information comprising a plurality of possible series of trials and responses, wherein each possible series of trials responses is associated with a recommended next trial of the plurality of trials;
determine, for each of the plurality of responses, a next trial for the user to perform by (i) matching the data representative of the plurality of responses to a series of trials and responses of the plurality of possible series of trials and responses, (ii) determining, based on the plurality of responses, a parameter of an odor detection threshold that corresponds to a steepest slope, and (iii) determining a remaining number of trials for determining the odor detection threshold based at least in part on the parameter;
generate, for each of the plurality of responses, an instruction based at least in part on the next trial; and
provide, to a user interface rendered by a computing device, a set of one or more trials from the plurality of trials in accordance with the instruction.

10. The device of claim 9, further comprising the device configured to:
generate a measure corresponding to the odor detection threshold based at least in part on the plurality of responses.

11. The device of claim 9, wherein the one or more stimuli comprise one or more concentrations of one or more odorants.

12. The device of claim 11, wherein the one or more odorants comprise phenyl ethyl alcohol.

13. The device of claim 11, wherein the one or more odorants comprise at least one of: butanol, beta-ionone, rotundone, androstenone, or a trigeminal stimulant.

14. The device of claim 9, further comprising the device configured to:
determine a recommended next trial for each of the plurality of possible series of trials and responses by calculating an expected value and standard error of an estimate for a parameter of interest for each potential response to each of one or more unperformed trials of the plurality of trials; and
store the recommended next trial for each of the plurality of possible series of trials and responses.

15. The device of claim 14, wherein determining the recommended next trial for each of the plurality of possible series of trials and responses further comprises determining a trial of the one or more unperformed trials that minimized the standard error of the estimate for the parameter of interest.

16. The device of claim 9, further comprising the device configured to:
classify the user as normosmic, hyposmic, or anosmic based at least in part on the plurality of responses.

17. An olfactory test article comprising:
a plurality of trials, wherein a trial of the plurality of trials comprises a sealable tab and a stimulus that is provided therewith, wherein (i) a set of one or more trials from the plurality of trials is provided to a user interface, (ii) the user interface is rendered by a computing device in accordance with an instruction that is generated by the computing device, and (iii) the instruction is generated by:
receiving data representative of a plurality of responses, each response indicating whether or not a user detects one or more stimuli for the set of one or more trials;
accessing stored information comprising a plurality of possible series of trials and responses, wherein each possible series of trials responses is associated with a recommended next trial of the plurality of trials;
determining, for each of the plurality of responses, a next trial for the user to perform by (i) matching the data to a series of trials and responses of the plurality of possible series of trials and responses, (ii) determining, based on the plurality of responses, a parameter of an odor detection threshold that corresponds to a steepest slope, and (iii) determining a remaining number of trials for determining the odor detection threshold based at least in part on the parameter; and
generating, for each of the plurality of responses, the instruction based at least in part on the next trial.

18. The olfactory test article of claim 17, wherein the instruction is further generated by:
generating a measure corresponding to the odor detection threshold based at least in part on the plurality of responses.

19. The olfactory test article of claim 17, wherein the instruction is further generated by:
determining a recommended next trial for each of the plurality of possible series of trials and responses by calculating an expected value and standard error of an estimate for a parameter of interest for each potential response to each of one or more unperformed trials of the plurality of trials; and
storing the recommended next trial for each of the plurality of possible series of trials and responses.

20. The olfactory test article of claim 19, wherein determining the recommended next trial for each of the plurality of possible series of trials and responses further comprises determining a trial of the one or more unperformed trials that minimized the standard error of the estimate for the parameter of interest.

* * * * *